Feb. 24, 1953     E. K. JOHANSEN     2,629,639
BEARING LUBRICATING DEVICE
Filed March 5, 1949     3 Sheets-Sheet 1
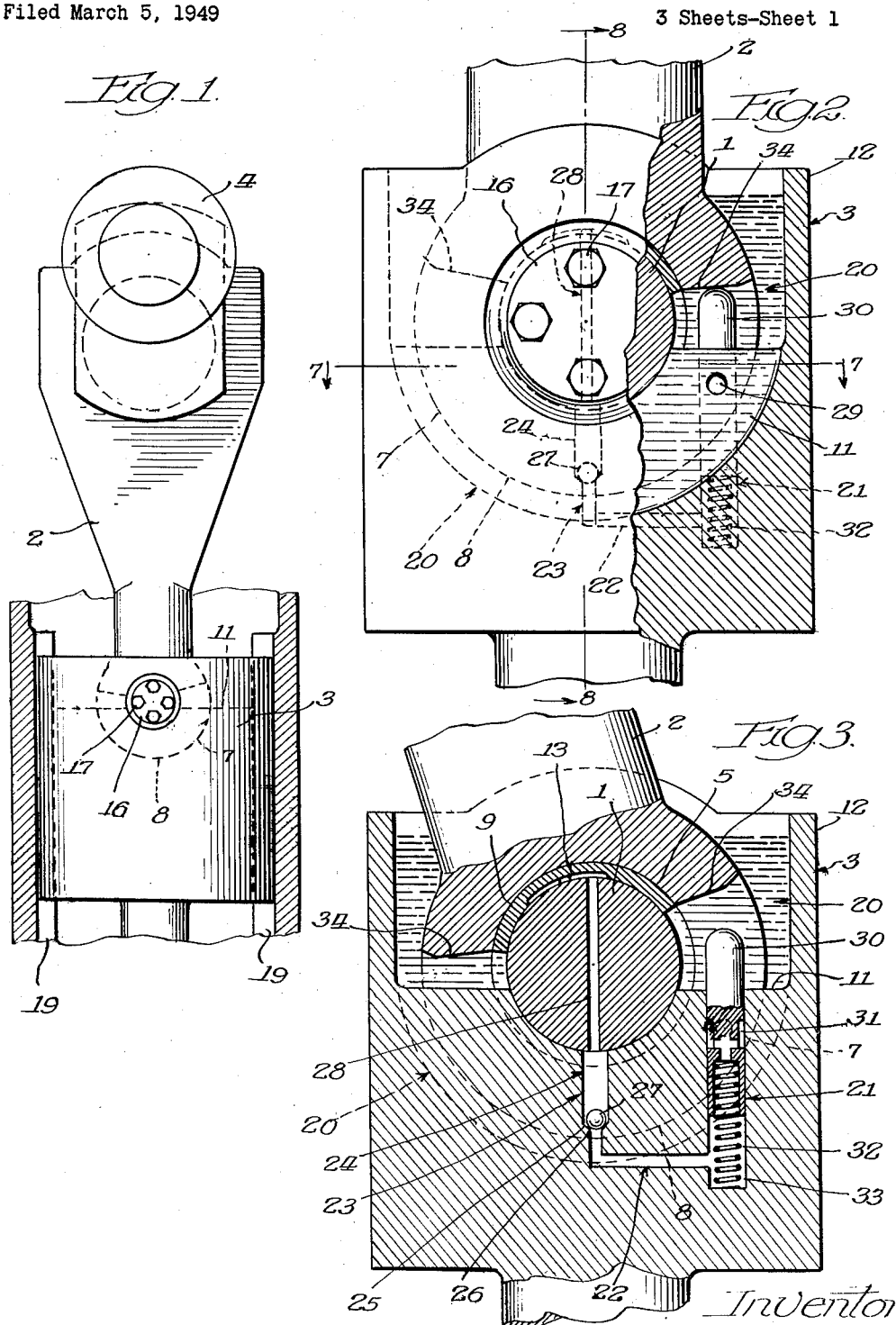
Inventor
Einar K Johansen
By: Spencer, Margall, Johnston & Cook, Attys

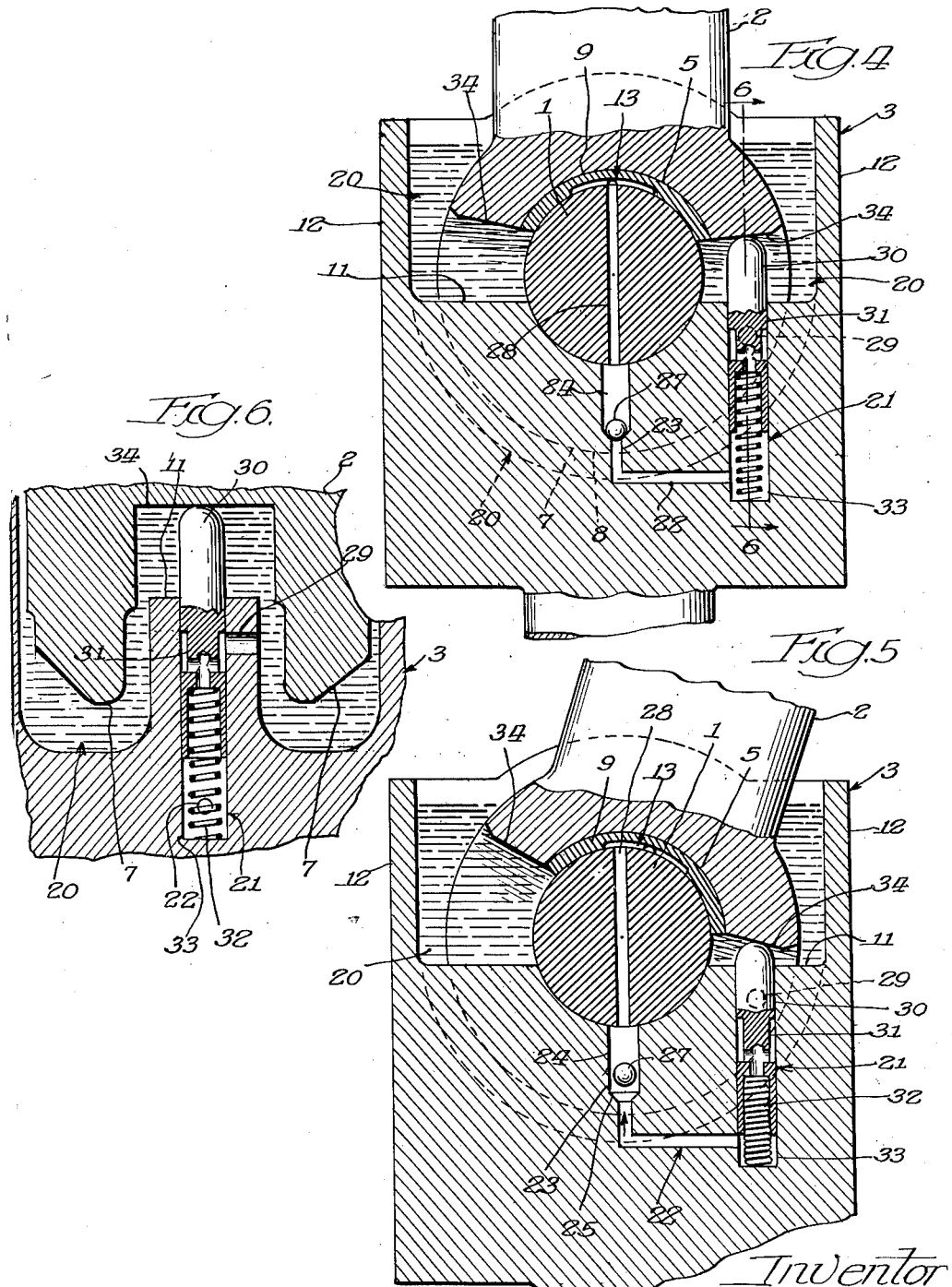

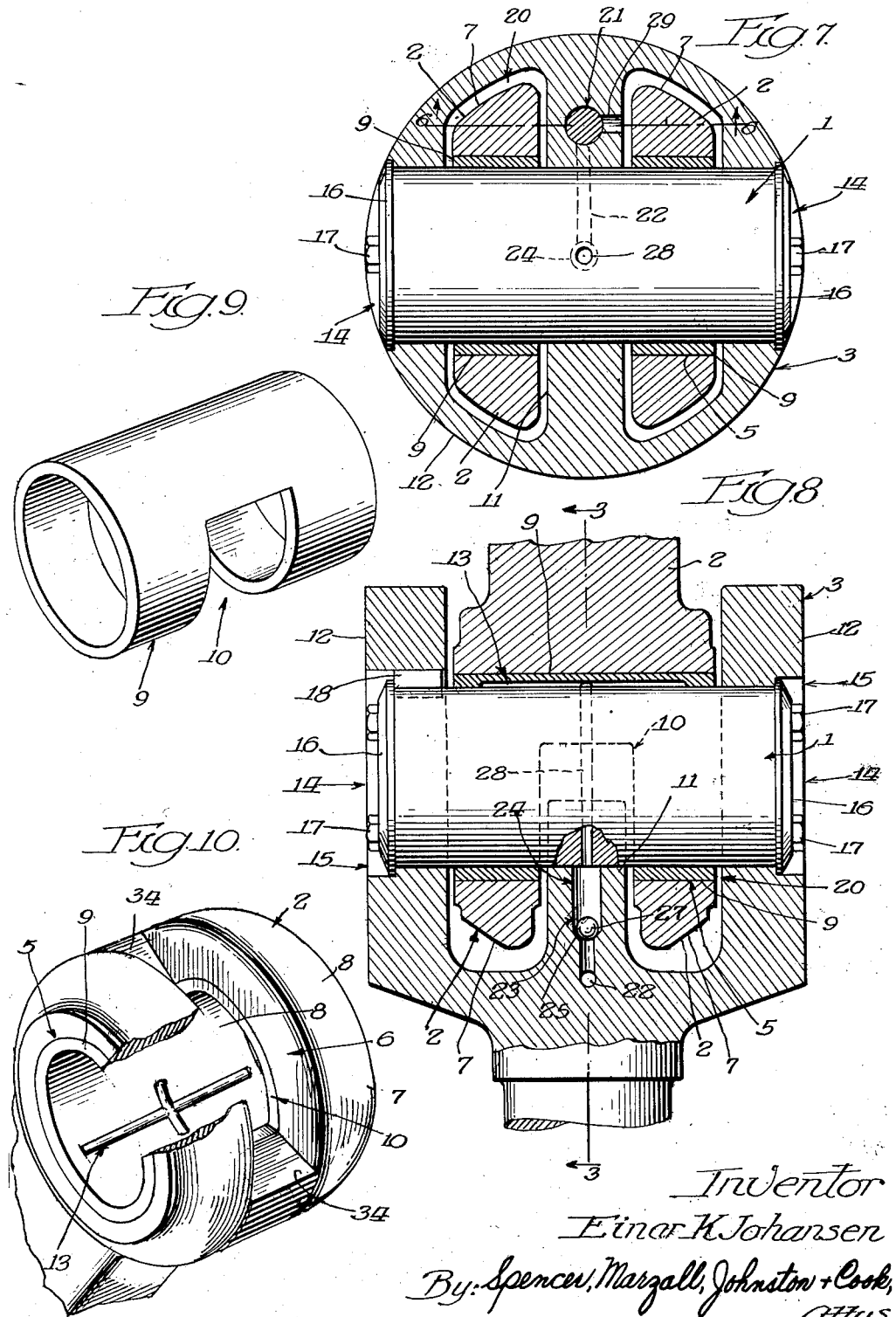

Patented Feb. 24, 1953

2,629,639

UNITED STATES PATENT OFFICE 2,629,639

BEARING LUBRICATING DEVICE

Einar K. Johansen, Oak Park, Ill., assignor to Clearing Machine Corporation, Chicago, Ill., a corporation of Illinois Application March 5, 1949, Serial No. 79,794

8 Claims. (Cl. 308—78)

This invention relates to bearing lubricating means and to the method of lubricating a bearing.

The primary object of the invention is to provide new and improved lubricating means for effectively and positively lubricating a bearing by means of a plunger element which will force lubricant to the main wearing surface of the bearing when the connecting rod or other driving or operating element assumes a certain predetermined position during the operation of an element with which the bearing is connected.

Another important object of the invention resides in the provision of a novel bearing lubricating element or means whereby a predetermined amount of lubricant will be forced to the main frictional contacting surface of the bearing at predetermined known intervals during operation of the elements which the bearing connects.

A further object of the invention is the provision of novel lubricating means for lubricating the main bearing surface of a bearing by the provision of a spring controlled plunger acting as a valve or injector for forcing a predetermined amount of lubricant to that part of the bearing which assumes the greatest load bearing portion of the operating elements to which the bearing is connected.

A still further object of the invention resides in the provision of a new and novel lubricating means which comprises fluid channels leading to a predetermined position of the bearing whereby the bearing will become lubricated during operation of machine elements with which the bearing is used, there being means for normally closing the channel to prevent the escape of fluid but which is displaceable by spring controlled ejector or plunger means which is brought into operative position during operation of the machine elements.

Still another object of the invention resides in the provision of a new and improved method of lubricating bearings which consists in causing a predetermined amount of lubricant to be forced through aligned channels periodically during operation of certain machine elements, such as a connecting rod.

Numerous other objects and advantages will be apparent through the progress of the specification which follows.

The accompanying drawings illustrate a certain selected embodiment of the invention, and the views therein are as follows:

Fig. 1 is a detail elevational view of a connecting rod having a bearing with which the invention is embodied, the connecting rod being shown as being driven by a crank and operating a crosshead;

Fig. 2 is a detail elevational view, partly in section, showing the bearing lubricating means in position with respect to the bearing, the connecting rod being in a predetermined position with respect to the crosshead which is operatively connected to the connecting rod;

Fig. 3 is a detail sectional view on the line 3—3 of Fig. 8 and showing the bearing lubricating means, the connecting rod being in a left hand position;

Fig. 4 is a view similar to Fig. 3 but showing the connecting rod in a different position;

Fig. 5 is a view similar to Figs. 3 and 4 but showing the connecting rod in a right hand position;

Fig. 6 is a vertical sectional view of the bearing lubricating means on the lines 6—6 of Figs. 4 and 7, the valve being shown at right angles to the valve as shown in Figs. 2-5, inclusive.

Fig. 7 is a detail plan sectional view taken substantially on the line 7—7 of Fig. 2;

Fig. 8 is a detail vertical sectional view taken substantially on the line 8—8 of Fig. 2;

Fig. 9 is a detail perspective view of a bearing bushing which may be used in connection with a bearing pin for connecting a connecting rod to a crosshead; and Fig. 10 is a detail perspective view of one end of the connecting rod with the bearing bushing mounted therein.

The bearing lubricating means of the present invention may be employed in connection with various types of bearings, but for the purpose of illustrating the present invention a specific bearing for connecting a connecting rod to a crosshead is disclosed. A bearing pin 1 of a predetermined length and circular in cross section is adapted to connect a machine element such as a connecting rod 2 to another machine element such as a crosshead 3. In the embodiment shown the connecting rod 2 is adapted to be operated by a crank 4.

The lower end of the connecting rod 2 is provided with a circular opening 5 provided therein to receive the bearing pin 1. The end of the connecting rod 2 may be cut away as indicated at 6, Fig. 10, to provide a space for certain operative parts of the lubricating mechanism. The space 6 divides the lower end of the connecting rod into two downwardly projecting parts 7, which are rounded as indicated at 8, Figs. 3, 4 and 10. A bushing 9, Fig. 9, is adapted to surround the bearing pin 1 and is arranged between the bearing pin and the inside opening 5 in the end of the connecting rod 2.

The bushing 9, Fig. 9, is provided with a cut-out 10 which cooperates with the cut-out 6 in the end of the connecting rod for the reception of an integral upstanding part or bridge 11 arranged between the side walls 12, 12 of the crosshead 3 and integral with the bottom of the crosshead 3.

The parts in assembled relationship will be as shown in Fig. 8 wherein the lower end of the connecting rod extends between the side walls 12, 12 of the crosshead and bridges the projection 11. The bushing surrounds the bearing pin 1 and is of a length substantially equal to the transverse distance of the connecting rod as shown in Fig. 8. The bushing is provided with an oil groove 13 arranged in the form of a cross, so as to provide a chamber to receive oil for the purpose of oiling the bearing pin 1. The bearing pin 1 is arranged in the side walls 12, 12 of the crosshead 3 in bearing openings 14 formed in these side walls 12. The openings 14 are enlarged at their outer ends as indicated at 15, Fig. 8, so as to receive a locking cap or plate 16 which is secured to each outer end of the bearing pin 1 in any suitable manner such as by bolts 17. The bearing pin 1 is prevented from rotating by means of a locking key 18, Fig. 8, which fits into complementary grooves formed in one end of the bearing pin and in a side wall 12 of the crosshead as clearly shown in Fig. 8. The operation of the crank 4, Fig. 1, causes oscillatory movement of the connecting rod 2, and the connection of the connecting rod 2 to the crosshead 4 causes vertical reciprocation of the crosshead 3 in vertical guides 19, Fig. 1.

The particular construction herein shown is for the purpose of operating a crosshead in connection with a press having reciprocating heads, and while the invention is being described in connection with a crank, a connecting rod and a reciprocating crosshead, the lubricating means of the invention may be incorporated with any other type of bearing. A press is adapted, ordinarily, to have the greatest pressure or thrust at the upper surface of the bearing pin. This pressure or thrust occurs against the upper surface of the pin while the upper head of the press is moving downwardly to cooperate with a lower die or element toward which the crosshead moves. The greatest pressure exerted in the press will be at the upper surface of the bearing pin 1, and therefore any film of oil which may be around the pin will be subjected to great strains and stresses, and in cases of enormous pressures will be completely squeezed or pressed out of the contacting surfaces at the upper end of the opening 5 and against the top of the bearing pin 1. Therefore, if the part of the bearing where the greatest pressure occurs is properly lubricated, the rest of the bearing will also be properly lubricated. Therefore the invention provides means for lubricating the upper part of the bearing pin where the greatest stresses and strains occur.

The means for lubricating the bearing consists in providing a well or other lubricant receiving reservoir 20 which is adapted to contain a predetermined amount of lubricant. In the present embodiment the reservoir is formed by the bottom of the crosshead and the surrounding enclosing wall 12. The reservoir 20 has communication with a vertical bore 21 formed in the upwardly projecting bridge 11 which extends upwardly from the bottom of the crosshead and is arranged between the side walls 12 of the crosshead, as clearly shown in Fig. 8. This lubricating bore or channel 21 communicates with a transverse bore or channel 22 formed in the bridge 11, Figs. 2–7, and extends laterally a predetermined distance where it communicates with another bore 23 extending upwardly from the bore channel 22. The upper end of the bore 23 is enlarged as indicated at 24, and has a sloping end wall 25 where the enlarged portion 24 merges with the lower smaller portion of the bore 22, as indicated at 26. Valve means such as a ball 27 is adapted to be arranged in the larger part 24 of the bore and normally seats against the sloping side walls 25 which form a valve seat for the ball valve 27. The ball 27, therefore, is adapted to seat normally against its seat 25 and prevent fluid from entering downwardly into the bore 23. The bore 23 is adapted to have communication with a vertical bore 28 extending completely through the bearing pin 1, at or substantially at the center thereof. The bore 28 is adapted to have communication with the oil groove or chamber 13 formed in the under side of the bearing bushing 9.

A bore 29, Figs. 2, 6 and 7, extends laterally through the bridge 11 and communicates with the bore 21 immediately below the upper part of the bridge 11, so as to furnish lubricant from the reservoir 20 to the main bore or channel 21. Lubricant from the reservoir 20, therefore, will pass through the bore 29 into the main channel 21, thence through the channels 22, 23 and 28 to the chamber 13 of the bushing 9. However, the oil or lubricant in the oil reservoir 20 cannot flow adequately by gravity to the upper surface of the bearing pin, and therefore means are provided for causing positive forced lubrication to the bearing.

The means for effecting this positive forced lubrication comprises a plunger 30 which is arranged in the main bore or channel 21. This plunger 30 has a plunger stem or valve 31 which is normally maintained in an upright position by means of an expansion spring 32 which is arranged below the valve 31 of the plunger 30, and seats in an elongated extension 33 of the main bore or channel 21, as clearly shown in Figs. 2–6, inclusive. The head of the plunger 30 extends upwardly a predetermined distance above the upper surface of the bridge 11 and extends upwardly into the cut-out 6 at the end of the connecting rod 2.

The upper end of the plunger rod is adapted to be operated by one of two shoulders 34, 34 which shoulders are formed by the cut-out 6. Therefore, when the connecting rod 2 is in the position to the left, as shown in Fig. 3, the spring 32 will raise the plunger cap, but when the connecting rod moves to the right the shoulder 34 will engage the top of the cap and press the cap downwardly against the tension of the spring 32, as clearly shown in Fig. 5. When the plunger cap 30 is depressed downwardly, as shown in Fig. 5, oil which has passed through the line 29 and into the chamber 21 will be forced through the bores 22, 23 and 28 and into the oil groove or chamber 13 in the bushing 9. The pressure of the oil passing through the bores or channels 21 and 22 will raise the ball 27 from its seat so as to permit the lubricant to flow freely through the bore 28 in the bearing pin 1, and lubricate the upper surface of the bearing pin. As the connecting rod moves from its right hand position, Fig.

5, to its left hand position, Fig. 3, the spring 32 will again raise the plunger to its uppermost position, Fig. 3, and remove a part of the plunger 30 away from the opening 29 and therefore permit the bores 21 and 22 to be filled again with fluid. The plunger 30 is such that when the plunger is in its normal upper position, as shown in Fig. 3, the bore 29 will be unobstructed so as to permit free flow of fluid from the reservoir into the channels 21 and 22. However, when the connecting rod moves beyond center, Fig. 4, to depress the plunger 30, as shown in Fig. 5, a part of the plunger will cover or shut off the opening 29 and therefore prevent any surging action of the fluid in the reservoir and also to prevent fluid from being surged back upwardly out of the channel 21 and back into the reservoir. The plunger, therefore, causes a predetermined amount of fluid to be periodically forced from the channel 21 to the upper surface of the bearing 1. The periodic forcing of fluid will occur every time the connecting rod moves in a predetermined direction, to the right, Fig. 5.

The connecting rod which is shown for illustrative purposes to describe properly the invention moves rapidly during normal operation of the machine, and therefore fast consecutive lubricating applications are provided to the upper surface of the bearing. The rest of the bearing is properly lubricated because the amount of fluid which is in the chamber 13 will flow about the bearing on each side during the fast oscillations of the connecting rod. The forcing of the oil by the plunger is such that the oiling operation will occur during the upward movement of the connecting rod at a time when there is the least pressure applied to the bearing pin. The application of the invention is adaptable for any type of bearing and is also adapted to be applied on either the pressure or the return stroke of the machine element. However, it is desirable that the oil be applied to the pressure side of the bearing when the machine element is on its return stroke instead of when the machine element is on its pressure stroke.

The lubricating means comprising the bores 22 and 23 and the plunger 30 are preferably formed and arranged in the bridge 11 so as to be permanently located and not interfere with any operable part of the machine to which the invention is adapted to be applied. The bridge 11 not only serves as a means for supporting and engaging the lubricating means but also acts as a central support for the bearing pin 1 because the bridge 11 is arranged between the side walls 12 of the crosshead and supports the bearing pin 1 between the arms 7 of the connecting rod. The upper surface of the bridge 11 is curved to conform with the circular contour of the bearing pin 1. The upper surface of the bridge 11 is in direct contact with the lower side of the bearing 1 because of the cut-out 10 in the bushing 9. The entire peripheral surface of the bearing pin 1 is encased by the bushing 9, except at its lower end where the bridge 11 extends upwardly through the cut-out 10 in the bushing.

The invention provides an extremely inexpensive positively operating means for positively lubricating a bearing, particularly at the point where the greatest pressure is applied to the bearing. The lubricating means of the invention is adapted to be inexpensively applied to a bearing of a machine element and is extremely economical during operation.

Changes may be made in the form, arrangement and construction of the parts, and the method may be varied within certain limits, without departing from the spirit of the invention or sacrificing any of its advantages, and the right is hereby reserved to make all such changes as fall clearly within the scope of the appended claims.

The invention is hereby claimed as follows:

1. Bearing lubricating means for lubricating a bearing between a connecting rod and a cross-head, said cross-head having a bore therein leading to the bearing, an oil reservoir communicating with said bore, a plunger in the bore adapted to be operated by the movement of said connecting rod, and an injector valve also in the bore operated by the plunger to force oil into said bore and to the bearing.

2. Bearing lubricating means for lubricating a bearing of a pair of machine elements, one of said elements having a bore therein leading to the bearing, an oil reservoir communicating with said bore, said bearing having a bore therethrough in communication with the first bore, and a plunger valve in the first bore and operated by the other machine element to force oil through said bores to the opposite side of said bearing.

3. Bearing lubricating means for lubricating a bearing of a pair of machine elements, one of said elements having a bore therein leading to the bearing, an oil reservoir communicating with said bore, said bearing having a bore therethrough in communication with the first bore, a plunger valve in the first bore and operated by the other machine element to force oil through said bores, a bushing surrounding said bearing, said bushing being provided with a chamber in communication with the bore in the bearing.

4. Bearing lubricating means for lubricating a bearing of a pair of machine elements, one of said elements having a bore therein leading to the bearing, an oil reservoir communicating with said bore, said bearing having a bore therethrough in communication with the first bore, a plunger valve in the first bore and operated by the other machine element to force oil through said bores, a bushing surrounding said bearing, said bushing being provided with a chamber in communication with the bore in the bearing, said bushing also being provided with an opening therein for permitting oil in the first bore to pass into the bore in the bearing.

5. Bearing lubricating means for lubricating a bearing of a pair of machine elements, one of said elements having a bore therein leading to the bearing, an oil reservoir communicating with said bore, said bearing having a bore therethrough in communication with the first bore, a plunger valve in the first bore and operated by the other machine element to force oil through said bores, a bushing surrounding said bearing, said bushing being provided with a chamber in communication with the bore in the bearing, said bushing also being provided with an opening therein for permitting oil in the first bore to pass into the bore in the bearing, and a ball valve in the first bore to permit oil to flow in one direction but preventing oil from flowing in an opposite direction.

6. Lubricating means for lubricating a bearing which connects a pair of machine elements, one of said elements having a bore therein leading to the bearing, a reservoir for holding a predetermined quantity of lubricating fluid, there being an oil bore in one of said elements leading from the reservoir to said first named bore, and a plunger in the first named bore and adapted to be operated by the other of said elements to force lubricant in said first named bore to the bearing, said bearing having a bore transversely therethrough in communication with the first bore.

7. Lubricating means for lubricating a bearing which connects a pair of machine elements, one of said elements having a bore therein leading to the bearing, a reservoir for holding a predetermined quantity of lubricating fluid, there being an oil bore in one of said elements leading from the reservoir to said first named bore, a plunger in the first named bore and adapted to be operated by the other of said elements to force lubricant in said first named bore to the bearing, said bearing having a bore transversely therethrough in communication with the first bore and means to close the oil bore during operation of the plunger when oil is forced through the first bore.

8. Lubricating means for lubricating a bearing which connects a pair of machine elements, one of said elements having a bore therein leading to the bearing, a reservoir for holding a predetermined quantity of lubricating fluid, there being an oil bore in one of said elements leading from the reservoir to said first named bore, a plunger in the first named bore and adapted to be operated by the other of said elements to force lubricant in said first named bore to the bearing, said bearing having a bore transversely therethrough in communication with the first bore, and a valve in the first bore to permit fluid to flow in one direction and prevent fluid from flowing in an opposite direction.

EINAR K. JOHANSEN.

REFERENCES CITED

The following references are of record in the file of this patent:

UNITED STATES PATENTS

| Number | Name | Date |
|---|---|---|
| 824,187 | Lowe | June 26, 1906 |
| 1,804,236 | Sorenson | May 5, 1931 |

FOREIGN PATENTS

| Number | Country | Date |
|---|---|---|
| 5,792 | Great Britain | 1911 |
| 195,980 | Great Britain | Apr. 6, 1923 |